(12) United States Patent
Latva-Kokko

(10) Patent No.: US 10,865,459 B2
(45) Date of Patent: Dec. 15, 2020

(54) REACTOR FOR GAS-LIQUID MASS TRANSFER

(71) Applicant: OUTOTEC (FINLAND) OY, Espoo (FI)

(72) Inventor: Marko Latva-Kokko, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/921,992

(22) Filed: Jul. 7, 2020

(65) Prior Publication Data

US 2020/0332389 A1 Oct. 22, 2020

Related U.S. Application Data

(63) Continuation of application No. PCT/FI2018/050032, filed on Jan. 17, 2018.

(51) Int. Cl.
*C22B 3/04* (2006.01)
*C22B 3/02* (2006.01)
(Continued)

(52) U.S. Cl.
CPC .............. *C22B 3/02* (2013.01); *B01F 3/0412* (2013.01); *B01F 3/0473* (2013.01);
(Continued)

(58) Field of Classification Search
CPC ...... B01F 3/04; B01F 3/04106; B01F 3/0412; B01F 3/0473; B01F 3/04531; B01F 3/04588; B01F 2003/0468
(Continued)

(56) References Cited

U.S. PATENT DOCUMENTS 3,865,721 A 2/1975 Kaelin
4,699,740 A * 10/1987 Bollenrath .......... B01F 3/04609
261/93
(Continued)

FOREIGN PATENT DOCUMENTS

CN 103143286 A 6/2013
WO 0025930 A1 5/2000
WO 201302947 A2 5/2018

OTHER PUBLICATIONS

International Search Report issued by the Finnish Patent and Registration Office acting as the International Searching Authority in relation to International Application No. PCT/FI2018/050032 dated May 25, 2018 (7 pages).
(Continued)

*Primary Examiner* — Robert A Hopkins
(74) *Attorney, Agent, or Firm* — Robert P. Michal, Esq.; Carter, DeLuca & Farrell LLP

(57) ABSTRACT

A reactor for gas-liquid mass transfer between a gas and a liquid or slurry includes a tank for receiving the liquid or slurry having a wall; a drive shaft; an upward pumping impeller; and an aerating apparatus disposed above the upward pumping impeller and extending between the drive shaft and the wall of the tank at a first distance (d1) from the drive shaft and at a second distance (d2) from the wall of the tank, the aerating apparatus encircling the drive shaft at least partially. The aerating apparatus has an outward inclined or curved inner surface for directing at least a part of the flow over the inner surface.

21 Claims, 10 Drawing Sheets

(51) Int. Cl.
*B01F 3/04* (2006.01)
*B01J 19/18* (2006.01)

(52) U.S. Cl.
CPC ...... *B01F 3/04531* (2013.01); *B01F 3/04588* (2013.01); *C22B 3/04* (2013.01); *B01F 2003/0468* (2013.01); *B01J 19/18* (2013.01)

(58) Field of Classification Search
USPC .......................................................... 261/93
See application file for complete search history.

(56) References Cited

U.S. PATENT DOCUMENTS

| | | | |
|---|---|---|---|
| 6,158,722 | A | 12/2000 | Gigas |
| 9,731,988 | B2 * | 8/2017 | Beaudouin .......... B01F 3/04531 |
| 9,815,033 | B2 * | 11/2017 | Latva-Kokko ...... B01F 3/04517 |
| 2004/0234435 | A1 | 11/2004 | Bickham et al. |
| 2013/0327721 | A1 | 12/2013 | Grasa |

OTHER PUBLICATIONS

Written Opinion of the International Searching Authority issued by the Finnish Patent and Registration Office acting as the International Searching Authorityin relation to International Application No. PCT/FI2018/050032 dated May 25, 2018 (7 pages).

* cited by examiner

REACTOR FOR GAS-LIQUID MASS TRANSFER

CROSS-REFERENCE TO RELATED APPLICATIONS

This application is a continuation of PCT International Application No. PCT/FI2018/050032 filed Jan. 17, 2018, the disclosure of this application is expressly incorporated herein by reference in its entirety.

TECHNICAL FIELD

The present disclosure relates to a reactor, a plant and a method for gas-liquid mass transfer.

BACKGROUND

In applications such as hydrometallurgy, for example hydrometallurgical leaching, or waste water treatment, gas to liquid mass transfer and the rate thereof may be important for the operation of the application.

SUMMARY

A reactor for gas-liquid mass transfer between a gas and a liquid or slurry is disclosed. The reactor may comprise a tank for receiving the liquid or slurry, the tank having a wall. The reactor may further comprise a drive shaft extending vertically in the tank and rotatable about a vertical axis. The reactor may further comprise an upward pumping impeller for creating a flow of the liquid or slurry received in the tank generally upward and at the surface of the liquid or slurry, the upward pumping impeller being rotatable by the drive shaft and disposed in the upper part of the tank.

The reactor may further comprise an aerating apparatus, which may be disposed above the upward pumping impeller. The aerating apparatus may extend between the drive shaft and the wall of the tank at a first distance from the drive shaft and at a second distance from the wall of the tank, the aerating apparatus encircling the vertical axis at least partially. The aerating apparatus may have a lower edge and an upper edge. The aerating apparatus may further have, extending between the lower edge and the upper edge, an outward inclined or curved inner surface for directing at least a part of the flow over the inner surface outward from the vertical axis and over the upper edge.

BRIEF DESCRIPTION OF THE DRAWINGS

The accompanying drawings, which are included to provide a further understanding of the embodiments and constitute a part of this specification, illustrate various embodiments. In the drawings:

In FIGS. 1A to 9, the reactors, the plant and the method are illustrated as schematic drawings. The drawings may not be in scale.

DETAILED DESCRIPTION

Figure 1A:
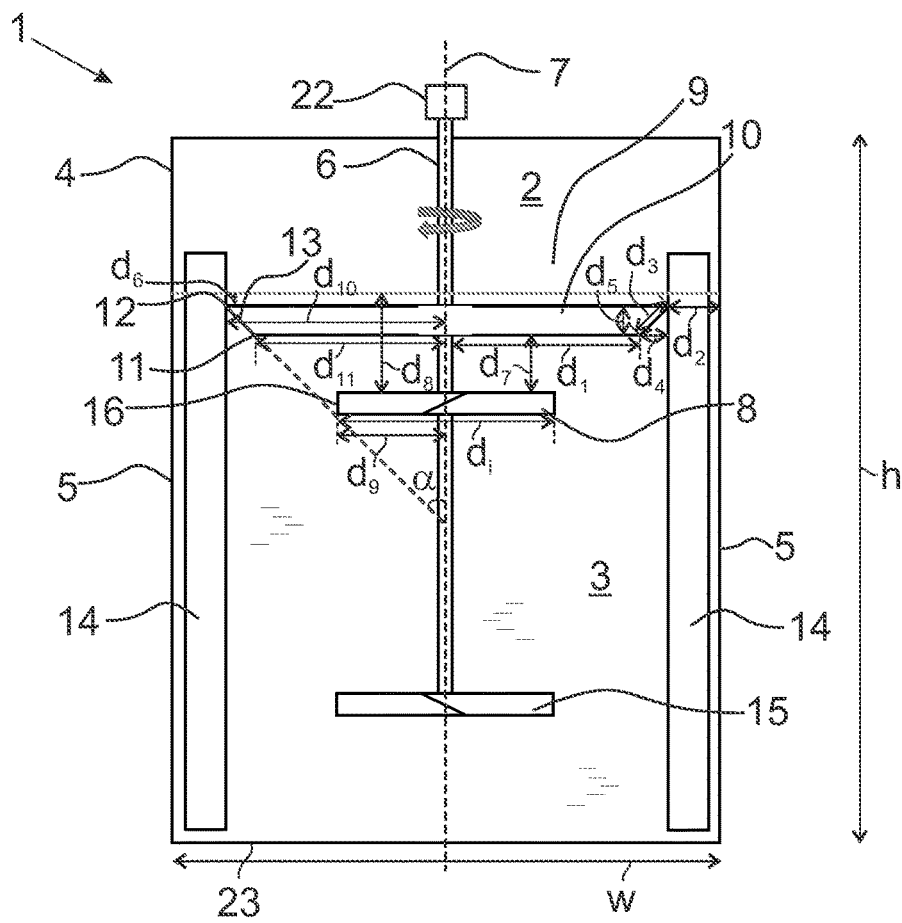
FIGS. 1A and 1B illustrate alternative views and details of a reactor and a method for gas-liquid mass transfer.

A reactor for gas-liquid mass transfer between a gas and a liquid or slurry is disclosed. The reactor may comprise a tank for receiving the liquid or slurry, the tank having a wall. The reactor may further comprise a drive shaft extending vertically in the tank and rotatable about a vertical axis. The reactor may further comprise an upward pumping impeller for creating a flow of the liquid or slurry received in the tank generally upward and at the surface of the liquid or slurry, the upward pumping impeller being rotatable by the drive shaft and disposed in the upper part of the tank.

The reactor may further comprise an aerating apparatus, which may be disposed above the upward pumping impeller. The aerating apparatus may extend between the drive shaft and the wall of the tank at a first distance from the drive shaft and at a second distance from the wall of the tank, the aerating apparatus encircling the vertical axis at least partially. The aerating apparatus may have a lower edge and an upper edge. The aerating apparatus may further have, extending between the lower edge and the upper edge, an outward inclined or curved inner surface for directing at least a part of the flow over the inner surface outward from the vertical axis and over the upper edge.

The reactor and the presence of the aerating apparatus may have a significantly improved gas-liquid (i.e. gas to liquid) mass transfer, as it may enhance mass transfer through the surface of the liquid or slurry. The aerating apparatus may direct the at least the part of the flow over the inner surface outward from the vertical axis and over the upper edge, so that the at least the part of the flow may travel a longer distance in contact with the gas above the surface of the liquid or slurry, and the gas to liquid mass transfer may increase as compared to a reactor without the aerating apparatus. Even without any additional gas feed, for example through a sparger, higher volumetric mass transfer coefficients may be achieved with a similar mixing power as compared to other reactor configurations.

The slurry may be a mixture of liquid and insoluble particles, for example particles of ore and/or minerals. Furthermore, the liquid may be understood as referring to a liquid which may contain also insoluble particles or other solid components mixed and/or suspended therein. For example, the liquid may be or comprise waste water or other aqueous liquid. The gas may be, for example, air and/or oxygen, but any other gas suitable or desired for the gas-liquid mass transfer may be utilized.

In an embodiment, the aerating apparatus is immovable relative to the tank.

In an embodiment, the inner surface is outward inclined at an angle of about 20° to about 80° with respect to the vertical axis.

In an embodiment, the inner surface of the aerating apparatus continuously encircles the vertical axis, thereby forming a closed perimeter.

In an embodiment, the distance of the lower edge and the upper edge along the inner surface is about 0.04 to 0.20 times the width of the tank.

In an embodiment, the distance of the lower edge and the upper edge in the radial direction is about 0.03 to 0.18 times the width of the tank.

In an embodiment, the distance of the lower edge and the upper edge in the vertical direction is about 0.03 to 0.18 times the width of the tank.

In an embodiment, the upper edge of the aerating apparatus has projections, indentations, and/or alternating projections and indentations.

In an embodiment, the reactor further comprises one or more baffles arranged between the wall of the tank and the upward pumping impeller, to which baffles the aerating apparatus is attached.

In an embodiment, the reactor further comprises a second impeller disposed below the upward pumping impeller.

In an embodiment, the ratio of the height of the tank to the width of the tank is in the range of 1:2 to 2.5:1, for example 0.7:1 to 2:1.

In an embodiment, the aerating apparatus is disposed above the upward pumping impeller such that when in use, the aerating apparatus is submerged in the liquid or slurry received in the tank, when the upward pumping impeller is activated so as to be rotated by the drive shaft.

In an embodiment, the aerating apparatus is disposed above the upward pumping impeller such that when in use, the aerating apparatus is at least partially submerged in the liquid or slurry received in the tank, when the upward pumping impeller is deactivated so as not to be rotated by the drive shaft.

In an embodiment, when in use, the upper edge of the aerating apparatus is disposed at a distance of about 0.015 to 0.075 times the width of the tank in the vertical direction from the surface of the liquid or slurry, when the upward pumping impeller is deactivated so as not to be rotated by the drive shaft.

In an embodiment, the distance in the vertical direction between the upward pumping impeller and the lower edge of the aerating apparatus is 0.1 to 0.8 times the width of the upward pumping impeller.

In an embodiment, when in use, the distance in the vertical direction between the upward pumping impeller and the surface of the liquid or slurry is 0.2 to 1.5 times the width of the upward pumping impeller.

In an embodiment, the upward pumping impeller has an outer edge disposed at a distance of the vertical axis, and the upper edge of the aerating apparatus is disposed at a distance of the vertical axis that is greater than said distance of the outer edge of the upward pumping impeller.

In an embodiment, the upward pumping impeller has an outer edge disposed at a distance of the vertical axis, and the lower edge of the aerating apparatus is disposed at a distance of the vertical axis that is greater than said distance of the outer edge of the upward pumping impeller.

The reactor may be a stirred tank reactor.

In an embodiment, the reactor is a stirred tank reactor for gas-liquid mass transfer between a gas and a liquid or slurry in a hydrometallurgical application, for example a hydrometallurgical leaching application.

A plant comprising the reactor according to one or more embodiments described in this specification is also disclosed.

In an embodiment, the plant is a hydrometallurgical plant. The hydrometallurgical plant may further comprise at least one of the following:

a crushing and/or grinding unit for grinding raw material (19), such as ore;

a unit for dissolution of the raw material in an aqueous solution for producing the slurry to be received in the tank; and/or a liquid/solid separation unit for separating residual solids from the slurry received in the tank.

A method for gas-liquid mass transfer between a gas and a liquid or slurry is also disclosed. The method may comprise providing the liquid or the slurry into a reactor according to one or more embodiments described in this specification and into the tank thereof;

rotating the upward pumping impeller, thereby creating a flow of the liquid or slurry received in the tank generally upward and at the surface of the liquid or slurry, so that the aerating apparatus is submerged in the liquid or slurry received in the tank; wherein the aerating apparatus disposed above the upward pumping impeller directs the at least the part of the flow over the inner surface outward from the vertical axis and over the upper edge.

In the context of the method, the reactor may be any reactor described in this specification.

In an embodiment, the method is a hydrometallurgical method, for example a hydrometallurgical leaching method. The method may further comprise one or more of the following:

crushing and/or grinding raw material, for example ore;

dissolving the raw material, e.g. the ore, in an aqueous solution for producing the slurry to be received in the tank; and/or separating residual solids from the slurry received in the tank.

Reference will now be made in detail to various embodiments, examples of which are illustrated in the accompanying drawings.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

For reasons of simplicity, item numbers will be maintained in the following exemplary embodiments in the case of repeating components.

FIG. 1A illustrates an exemplary embodiment of a reactor 1 for gas-liquid mass transfer between a gas 2 and a liquid or slurry 3. The reactor 1, which is a stirred tank reactor, is shown schematically as a partially cross-sectional side view. The reactor comprises a tank 4 for receiving the liquid or slurry 3. The tank 4 has a wall 5 and a bottom 23. When the reactor 1 is in use, the liquid or slurry 3 is received in the tank 4, such that the surface 9 of the liquid or slurry 3 is in contact with the gas 2 above. The liquid or slurry 3 may be received such that the surface 9 is at an intended surface level. In this exemplary embodiment, the tank 4 is cylindrical, i.e. it has a substantially circular or circular cross-section. However, in other embodiments, the tank 4 could have e.g. a rectangular cross-section. The exact measurements of the tank 4 may vary depending e.g. on the intended use of the reactor 1. For example, the width w of the tank 4 may be at least 1 m, or at least 1.5 m, but tanks with a diameter of e.g. 20 m or greater could be contemplated. The width w of the tank 4 may be understood as referring to the greatest diameter of the tank 4 in the horizontal direction. In embodiments in which the tank 4 is cylindrical, the width w is the diameter of the tank. The height h of the tank 4 could be at least 0.7 m, or at least 1 m, but tanks with a height of e.g. 25 m of greater could also be contemplated. The ratio of the height h of the tank to the width w of the tank may also vary. For example, the ratio of the height h of the tank to the width w of the tank may be e.g. in the range of 1:2 to 2.5:1. For example, the ratio could be in the range of 0.7:1 to 2:1. Other reactor and tank geometries could also be contemplated. For example, instead of the cylindrical tank 4 shown in FIGS. 1A and 1B, the reactor 1 could be an autoclave reactor. Such an autoclave reactor may comprise a horizontal tank.

The reactor 1 further comprises a drive shaft 6, which extends vertically in the tank 4. The drive shaft 6 is rotatable about a vertical axis 7. The reactor may further comprise a motor 22 for rotating the drive shaft 6. The motor 22 may be connected to the drive shaft 6 via a suitable drive, for example a mechanical gear or a drive belt (not shown).

The reactor 1 further comprises an upward pumping impeller 8. The upward pumping impeller 8 is rotatable by the drive shaft 6 and may, when the reactor is in use, be activated so as to be rotated by the drive shaft 6, and, on the other hand, deactivated so as not to be rotated by the drive shaft 6. In other words, the upward pumping impeller 8 is configured to be rotated by the drive shaft 6. The upward pumping impeller 8 is disposed in the upper part of the tank 4. The upward pumping impeller 8, when in use (activated and submerged in the liquid or slurry 3), may create a flow of the liquid or slurry 3 received in the tank generally upward and to the surface 9 of the liquid or slurry 3. At the surface 9, the upward pumping impeller 8 may create a flow radially outwards, i.e. radially outwards of the drive shaft 6 and towards the wall 5 of the tank 4. The flow pattern is described in more detail in FIGS. 2A and 2B. FIG. 1A depicts the reactor 1 in use such that the liquid or slurry 3 is received in the tank 4 but such that the upward pumping impeller 8 is deactivated and the surface 9 is even. The surface 9 is thus at the intended surface level.

The upward pumping impeller 8 may be any impeller, mixer or agitator, provided it is generally upward pumping. The exact geometry of the upward pumping impeller is not particularly limited, although for illustrative purposes, the upward pumping impeller 8 is shown as having four vanes extending outward from the vertical axis 7. However, a skilled person is aware of various other impeller geometries that may be used in the reactor 1.

The reactor 1 further comprises an aerating apparatus 10 disposed above the upward pumping impeller 8. When in use, the aerating apparatus 10 may be submerged in the liquid or slurry 3 received in the tank 4. The aerating apparatus 10 extends between the drive shaft and the wall of the tank at a first distance $d_1$ from the drive shaft 6 and at a second distance $d_2$ from the wall of the tank. Therefore flow of the liquid or slurry 3 extends, when in use, between the aerating apparatus 10 and the drive shaft 6 and, on the other hand, between the aerating apparatus 10 and the wall 5 of the tank 4. The distances $d_1$ and/or $d_2$ may be considered to be the shortest distance(s) between the aerating apparatus 10 and the drive shaft 6 or the wall 5, respectively.

The aerating apparatus 10 may encircle the vertical axis 7 (and the drive shaft 6) at least partially. In this exemplary embodiment, the aerating apparatus 10 encircles the vertical axis 7 and the drive shaft 6 continuously, although other embodiments in which the aerating apparatus 10 encircles the vertical axis 7 only partially, e.g. discontinuously, may be contemplated. The lower edge 11 of the aerating apparatus 10 therefore defines an aperture through which at least a part of the flow created by the upward pumping impeller 8 is directed.

The aerating apparatus 10 has a lower edge 11 and an upper edge 12 and, extending between the lower edge 11 and the upper edge 12, an outward inclined or curved inner surface 13 for directing at least a part of the flow over the inner surface 13 outward from the vertical axis and over the upper edge. In other words, the inner surface 13, and thereby the aerating apparatus 10, is configured to direct at least a part of the flow over the inner surface 13 outward from the vertical axis and over the upper edge 12. The flow pattern and the effect of the aerating apparatus 10 thereto are described in more detail in FIGS. 2A and 2B. The inner surface 13 may be at least partially inclined and/or at least partially curved.

In this embodiment, the inner surface 13 is inclined outward, i.e. radially outward from the vertical axis 7. The angle α of the inner surface 13 with respect to the vertical axis 7 is not particularly limited. For example, the inner surface 13 may be outward inclined at an angle α of about 10° to about 85°, or of about 20° to about 80°, with respect to the vertical axis 7. An angle α of about 35° to about 55°, or of about 40° to about 50° may be particularly well suited for directing the flow. At least a part of the inner surface 13 may be outward inclined, for example at an angle of about 20° to about 80° with respect to the vertical axis. In this embodiment, the aerating apparatus 10, or at least the inner surface 13, has the shape of a truncated cone. The aerating apparatus 10 is shown here as being formed of a relatively thin material, for example of a thin metal sheet, but the material and the geometry of other parts of the aerating apparatus 10 are not particularly limited.

As shown in FIG. 1A, the aerating apparatus 10 may be at least partially or completely submerged in the liquid or slurry 3, or at least such that the upper edge 12 is submerged in the liquid or slurry 3. FIG. 1A depicts the reactor 1 in use such that the liquid or slurry 3 is received in the tank 4 but such that the upward pumping impeller 8 is deactivated and the surface 9 is even. The aerating apparatus 10 may be submerged in the liquid or slurry 3 when the upward pumping impeller 8 is deactivated, but as will be described in the context of FIGS. 2A and 2B, it will then typically also be generally submerged in the liquid or slurry 3 when the upward pumping impeller 8 is activated. However, in other embodiments, the aerating apparatus 10 may be only partially submerged when in use and the when the upward pumping impeller 8 is deactivated.

Various measurements and geometries of the reactor 1 and the aerating apparatus 10 may be contemplated, depending on e.g. the geometry, size and other parameters of the upward pumping impeller 8, the geometry, size and other parameters of the tank 4, and/or other factors. A skilled person is capable of selecting suitable measurements and geometries, but some examples of possible measurements and geometries are described in this context.

The distance between the lower edge 11 and the upper edge 12 along the inner surface 13, i.e. $d_3$, may be about 0.04 to 0.20 times the width w of the tank 4, for example 0.08 times the width w of the tank 4. The distance between the lower edge 11 and the upper edge 12 along the inner surface 13, i.e. $d_3$, may be considered to be the shortest distance between the lower edge 11 and the upper edge 12 along the inner surface 13, as shown in FIG. 1A. Although the shortest distance $d_3$ is, in this embodiment in which the inner surface 13 is inclined, along a straight line, in other embodiments the shortest distance $d_3$ may e.g. along a curved or arcuate path, if the inner surface 13 is curved or arcuate.

Figure 1B:
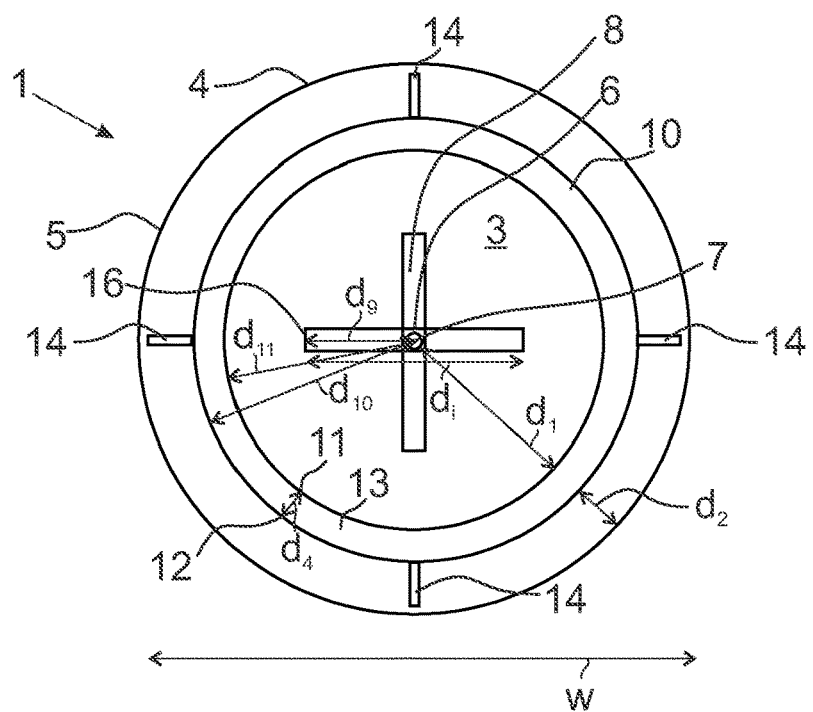

The distance between the lower edge 11 and the upper edge 12 in the radial direction, i.e. $d_4$, may be e.g. about 0.03 to 0.18 times the width w of the tank 4. The distance between the lower edge 11 and the upper edge 12 in the radial direction, i.e. $d_4$, may be considered to be the shortest distance between the lower edge 11 and the upper edge 12 projected in the radial direction, as shown in FIGS. 1A and 1B.

The distance of the lower edge 11 and the upper edge 12 in the vertical direction, i.e. $d_5$, may be e.g. about 0.03 to 0.18 times the width w of the tank. The distance of the lower edge 11 and the upper edge 12 in the vertical direction, i.e. $d_5$, may be considered to be the shortest distance between the lower edge 11 and the upper edge 12 projected in the vertical direction, as shown in FIG. 1A.

The aerating apparatus 10 may be immovable relative to the tank 4. In particular, it may be unrotatable about the vertical axis 7. In other words, it may not be rotatable about the vertical axis 7 or otherwise movable relative to the tank 4. The aerating apparatus 10 may therefore be considered passive, i.e. it does not require an energy source for operation. However, in certain embodiments, the aerating apparatus 10 may be rotatable about the vertical axis 7, although when in use, rotation at a relatively high speed may in some situations adversely affect the flow of the liquid or slurry.

The aerating apparatus 10 may be attached to the reactor 1 in various ways. For example, as shown in the exemplary embodiment of FIGS. 1A and 1B, the reactor 1 may further comprise one or more baffles 14. The baffles 14 may be arranged between the wall 5 of the tank 4 and the upward pumping impeller 8. The aerating apparatus 10 may be attached to the one or more baffles 14. In this embodiment, the reactor 1 comprises a plurality, for example two, three, four or more, baffles arranged at different locations about the vertical axis 7. The baffles 14 may be attached to the tank 4, for example to the walls 5 and/or to the bottom 23 of the tank 4. The aerating apparatus 10 is, in this embodiment, disposed between the baffles 14 and the drive shaft 6.

The reactor 1 may further comprise a second impeller 15 disposed below the upward pumping impeller. The second impeller 15 may be an auxiliary impeller. The reactor 1 may, in other embodiments, comprise one or more further impellers, for example a third impeller (not shown) disposed below the upward pumping impeller. The second impeller 15 may not be necessary for effective gas-liquid mass transfer between the gas 2 and the liquid or slurry 3, although it may assist in it in some embodiments. It may, however, assist in mixing the liquid or slurry 3. The pumping direction of the second impeller 15 is not particularly limited. The second impeller 15 may be a downward pumping impeller, as shown in FIG. 1A. This configuration may be relatively effective in mixing the liquid or slurry 3. Other types of impellers may additionally or alternatively be contemplated.

When in use, the upper edge 12 of the aerating apparatus 10 may, in this exemplary embodiment, be disposed below the surface 9 at a distance $d_6$ of about 0.015 to 0.075 times the width w of the tank in the vertical direction from the surface 9 of the liquid or slurry 3, i.e. the intended surface level, when the upward pumping impeller is deactivated so as not to be rotated by the drive shaft. The distance $d_6$ may be considered to be the shortest distance between the upper edge 12 and the surface 9 of the liquid or slurry 3. The distance in the vertical direction between the upward pumping impeller 8 and the lower edge 11 of the aerating apparatus $d_7$ may be 0.1 to 0.8 times the diameter $d_1$ of the upward pumping impeller. The distance $d_7$ may be considered to be the shortest distance in the vertical direction between the upward pumping impeller 8 and the lower edge 11.

The upward pumping impeller 8 is disposed in the upper part of the tank 4. The upper part of the tank 4 may be understood as being the upper half of the tank 4 in the vertical direction.

When in use, the distance in the vertical direction between the upward pumping impeller 8 and the surface 9 of the liquid or slurry, i.e. $d_8$, may be 0.2 to 1.5 times, for example 0.2 to 0.9 times, or 0.4 to 0.6 times, or 0.5 times, the diameter ($d_1$) of the upward pumping impeller. The distance $d_8$ may be considered to be the shortest distance between the upward pumping impeller 8 and the surface 9, when the upward pumping impeller 8 is deactivated. The distance $d_8$ may depend, for example, on the type of the upward pumping impeller.

The upward pumping impeller 8 has an outer edge 16 disposed at a distance $d_9$ of the vertical axis 7. The distance $d_9$ may be considered to be the shortest distance between the outer edge 16 and the vertical axis 7. The upper edge 12 of the aerating apparatus 10 may be disposed at a distance of the vertical axis 7, i.e. at distance $d_{10}$, that is greater than said distance $d_9$ of the outer edge 16 of the upward pumping impeller 8. The distance $d_{10}$ may be considered to be the shortest distance between the upper edge 12 and the aerating apparatus 10.

The lower edge 11 of the aerating apparatus 10 may be disposed at a distance $d_{11}$ of the vertical axis 7 that is greater than the distance $d_9$ of the outer edge 16 of the upward pumping impeller 8. The distance du may be considered to be the shortest distance between the lower edge 11 and the vertical axis 7.

The reactor 1 may be a stirred tank reactor for gas-liquid mass transfer between a gas and a liquid or slurry in a hydrometallurgical application, for example in hydrometallurgical leaching. Alternatively or additionally, the reactor 1 may be suitable for gas-liquid mass transfer in the treatment of waste water. Other possible applications for the reactor may also be contemplated.

FIG. 1B shows the reactor 1 of FIG. 1A as a top view. In this exemplary embodiment, the inner surface 13 of the aerating apparatus 10 continuously encircles the vertical axis 7 (and the drive shaft 6), thereby forming a closed, circular perimeter.

Figure 2A:
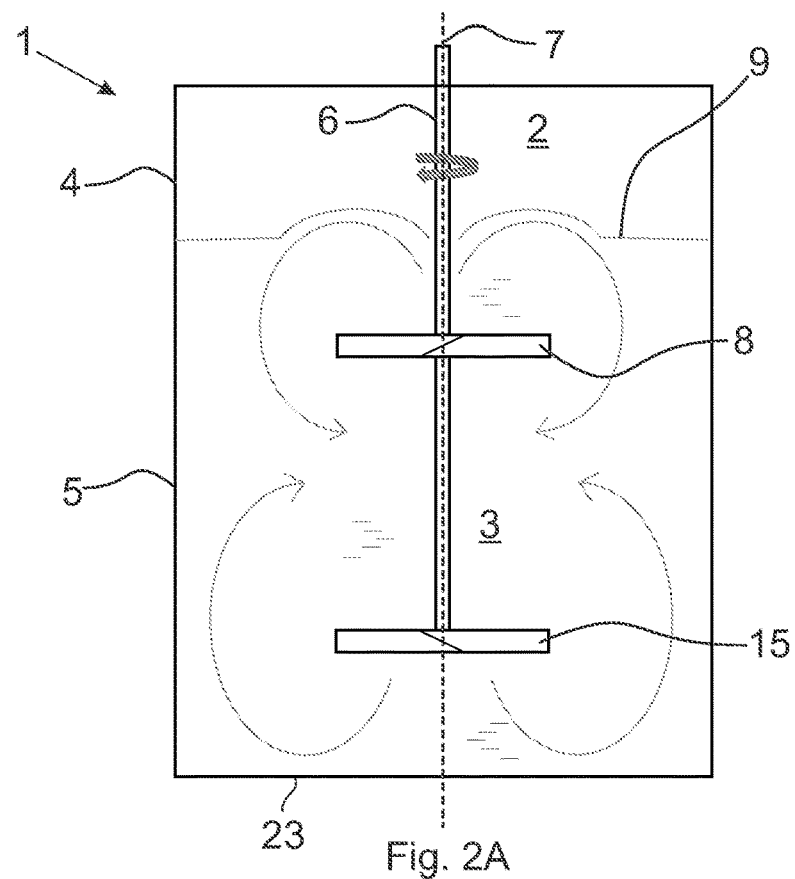
FIGS. 2A and 2B illustrate alternative views and details of a reactor and a method for gas-liquid mass transfer.
Figure 2B:
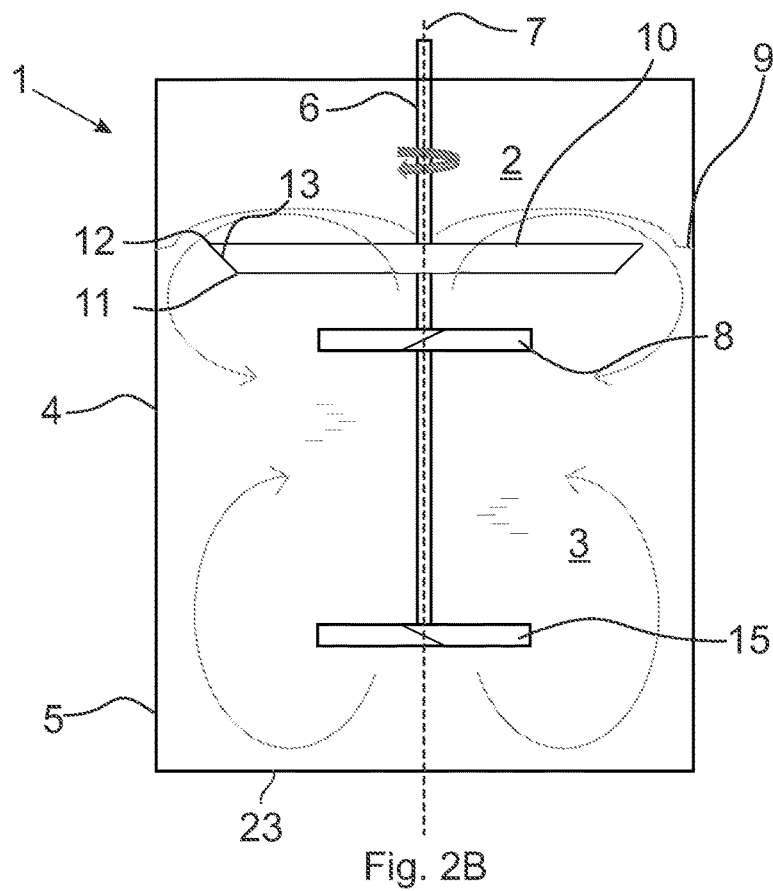

FIG. 2A illustrates schematically flow patterns, depicted with arrows, in a reactor 1 that does not comprise an aerating apparatus 10 but is otherwise similar to the reactor 1 shown in FIGS. 1A, 1B and 2B which does comprise an aerating apparatus 10. Further, in FIGS. 2A and 2B, baffles are omitted from the Fig. for clarity, but could of course be included in the reactor 1. Certain dimensions of the reactor 1 have been omitted from this Fig. for clarity. In the reactor 1 of FIG. 2A without the aerating apparatus, when in use, the upward pumping impeller 8 may create a flow of the liquid or slurry 3 received in the tank 4 generally upward and at the surface 9 of the liquid or slurry 3. At the surface 9 of the liquid or slurry 3, the flow may be relatively strong, such that the surface 9 is higher and the area of the surface 9 is greater than it would be when the upward pumping impeller 8 is deactivated (i.e. higher than the intended surface level). This flow at the surface 9 may thus cause or increase gas-liquid mass transfer between the gas 2 and the liquid or slurry 3. Near or at the surface 9, the upward pumping impeller 8 may cause at least a part of the flow to turn radially outward, i.e. radially outward of the drive shaft 6 and towards the wall 5 of the tank 4. Radially further outward, the flow may then turn, such that at least a part of the flow may turn downward. The upward pumping impeller 8 may thus create a flow that circulates the liquid or slurry 3 to the surface 9 and subsequently downward from the surface.

The second impeller 15 does not necessarily directly create or significantly contribute to the flow generally upward and at or near the surface 9, but it may mix and circulate the liquid or slurry below the upward pumping impeller 8 as shown in FIGS. 2A and 2B. It may thereby improve the gas-liquid mass transfer at least indirectly.

FIG. 2B illustrates schematically flow patterns, depicted with arrows, in a reactor 1 that does comprise an aerating apparatus 10. The reactor 1 is similar to that shown in FIGS. 1A and 1B, and for clarity certain details and dimensions have been omitted from this Fig. When in use, the upward pumping impeller 8 may create a flow of the liquid or slurry 3 received in the tank 4 generally upward and at or near the surface 9 of the liquid or slurry 3. At the surface 9 of the liquid or slurry 3, the flow may be relatively strong, such that the surface 9 is higher and the area of the surface 9 is greater than it would be when the upward pumping impeller 8 is deactivated. This flow at or near the surface 9 may thus cause or increase gas-liquid mass transfer between the gas 2 and the liquid or slurry 3. Near or at the surface 9, the upward pumping impeller 8 may cause at least a part of the flow to turn radially outward, i.e. radially outward of the drive shaft 6 and towards the wall 5 of the tank 4.

The upward pumping impeller 8 may thus create a flow that circulates the liquid or slurry 3 to the surface 9. However, as compared to the reactor of FIG. 2A, the aerating apparatus 10 directs at least a part of the flow over the lower edge 11, over the inner surface 13 outward from the vertical axis 7 and over the upper edge 12. Radially further outward, the flow may then turn, such that at least a part of the flow may turn downward, such that the at least the part of the flow may be directed downward between the aerating apparatus 10 and the wall 5 of the tank 4. The aerating apparatus 10 may thus be configured to direct the at least the part of the flow radially further outward at the surface 9, such that the at least the part of the flow is caused to flow a longer distance in the radial direction at the surface 9 than it would in the absence of the aerating apparatus 10. This may increase the contact of the liquid or slurry 3 with the gas 2 at the surface, i.e. the contact area and/or period of contact, and thereby significantly improve the gas-liquid mass transfer.

Figure 3A:
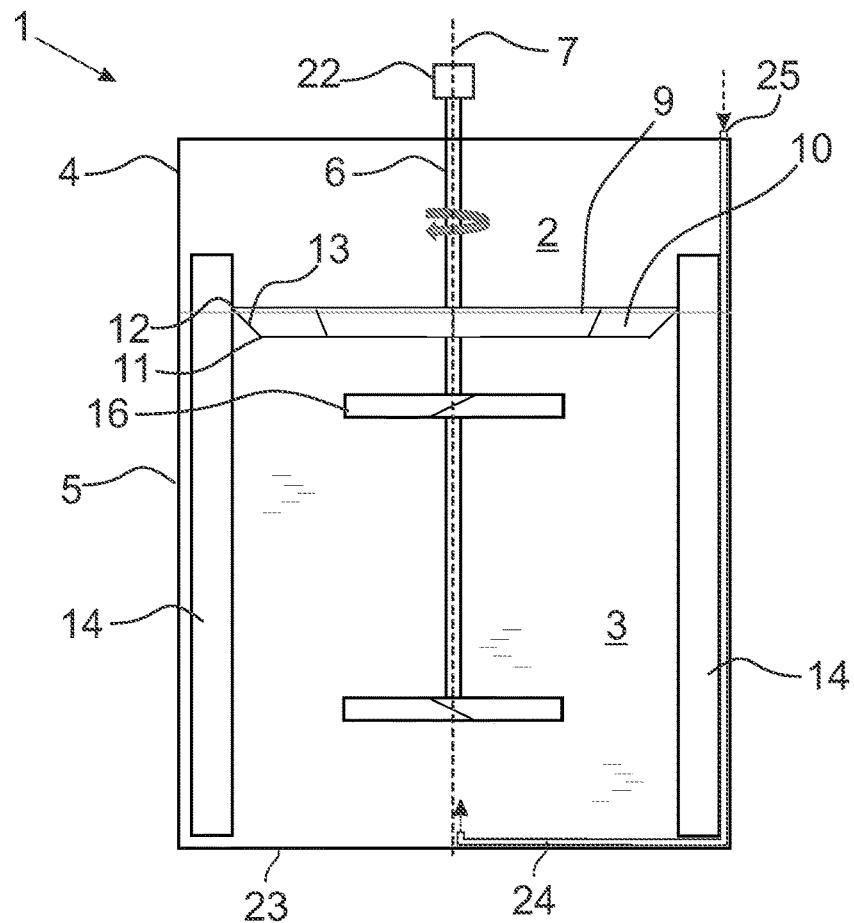
FIGS. 3A and 3B illustrate alternative views and details of a reactor and a method for gas-liquid mass transfer.
Figure 3B:
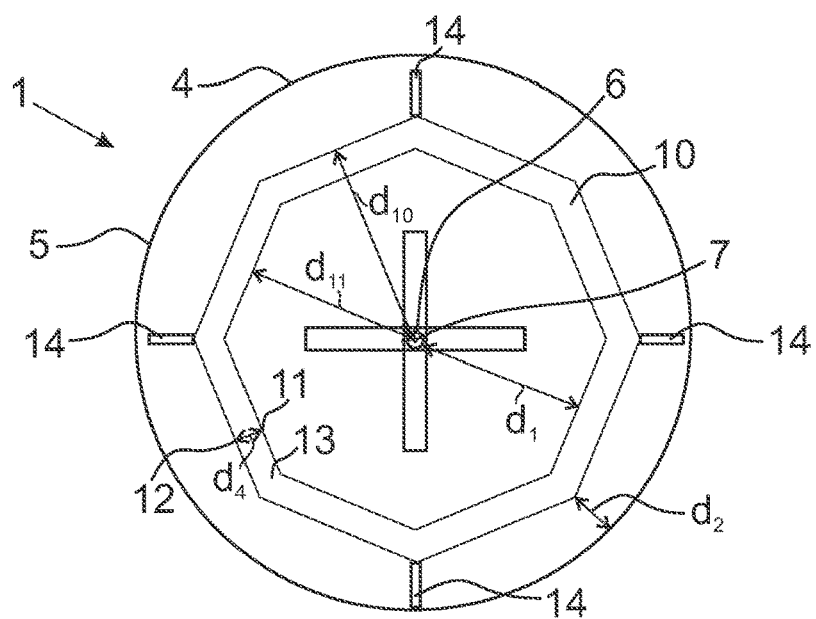

The embodiment of the reactor 1 shown in FIGS. 3A and 3B differs from that shown in FIGS. 1A, 1B and 2B at least in that the aerating apparatus 10 is not circular but polygonal, specifically octagonal in this embodiment, when viewed from above. In alternative embodiments, the aerating apparatus 10 could be e.g. triangular, rectangular, pentangular, hexagonal, heptagonal, nonagonal or decagonal. In this exemplary embodiment, the inner surface 13 of the aerating apparatus 10 continuously encircles the vertical axis 7 (and the drive shaft 6), thereby forming a closed perimeter.

The embodiment of the reactor 1 shown in FIGS. 3A and 3B differs from that shown in FIGS. 1A, 1B and 2B also in that the upper edge 12 of the aerating apparatus 10 is disposed above the surface 9 of the liquid or slurry 3. The aerating apparatus 10 is thus partially submerged in the liquid or slurry 3, when the reactor 1 is in use but the upward pumping impeller 8 is deactivated. When the upward pumping impeller 8 is activated, it may cause the flow of the liquid or slurry 3 to submerge the aerating apparatus 10 completely.

The reactor 1 may further comprise a gas sparging apparatus 24. The gas sparging apparatus 24, i.e. sparger, may be configured for dispersing gas fed (illustrated with arrows) from a gas inlet 25. The gas sparging apparatus 24 may be disposed below the upward pumping impeller 8 and optionally below the second impeller 15 for dispersing the gas fed to bubbles. The gas sparging apparatus 24 could further be included in any one of the embodiments of the reactor described in FIGS. 1A to 8C.

Other aspects of the embodiment shown in FIGS. 3A and 3B are generally similar to those of the embodiment shown in FIGS. 1A to 2B.

Figure 4A:
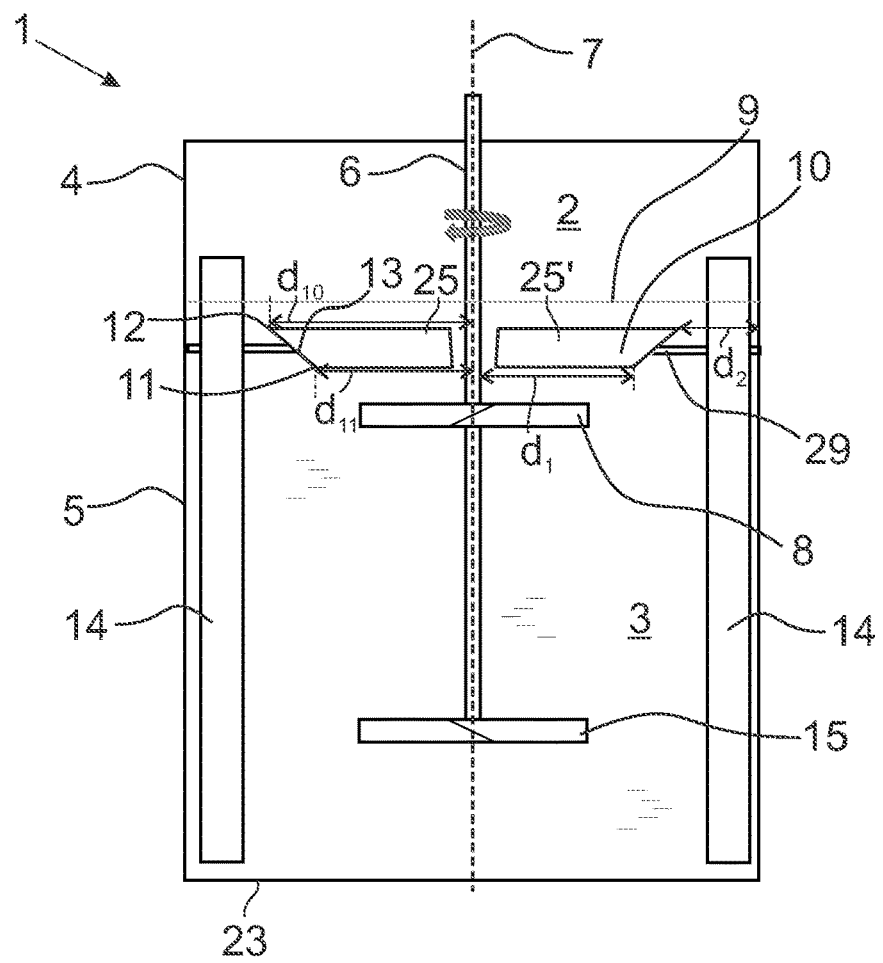
FIGS. 4A and 4B illustrate alternative views and details of a reactor and a method for gas-liquid mass transfer.
Figure 4B:
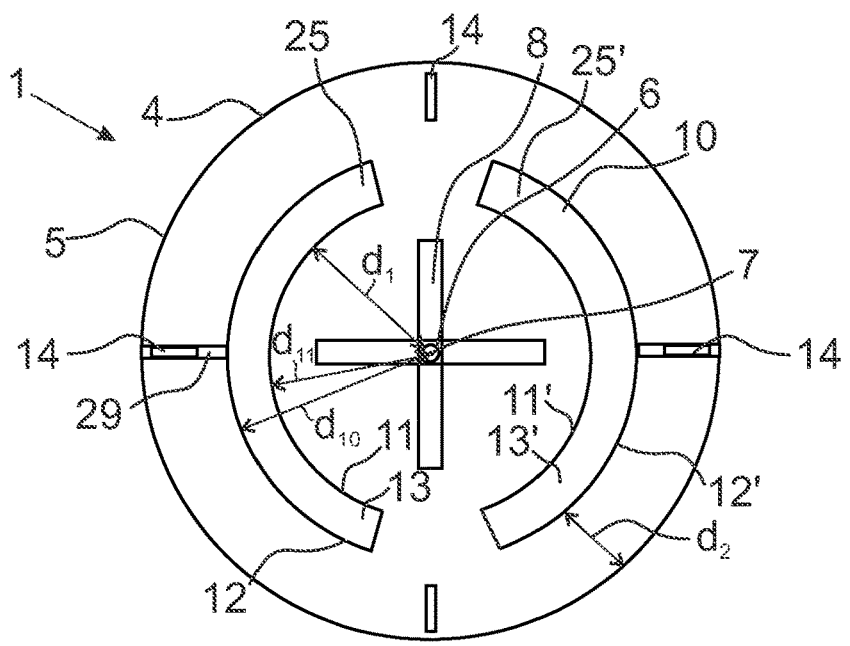

The embodiment of the reactor 1 described in FIGS. 4A and 4B differs from those described in FIGS. 1A to 3B at least in that it comprises a smaller aerating apparatus 10 disposed further away from the wall 5 of the tank 4. In other words, the aerating apparatus 10 is disposed at a second distance $d_2$ from the wall of the tank, the second distance d2 in this embodiment being greater than e.g. in the embodiment described in FIGS. 1A and 1B. The distances $d_1$, $d_{10}$, and $d_{11}$ are also smaller than e.g. in the embodiment described in FIGS. 1A and 1B. A skilled person may select suitable dimensions for the reactor 1 based on its size, configuration and various other factors.

This embodiment further differs from those described in FIGS. 1A to 3B in that the aerating apparatus 10 comprises two segments 25, 25'. These segments 25, 25' are arranged at opposite sides of the tank 4. In other embodiments, the aerating apparatus 10 may comprise at least one segment 25, 25', each segment having a lower edge 11, 11', an upper edge 12, 12', and an inner surface 13, 13'. The aerating apparatus 10 thus encircles the vertical axis 7 and the drive shaft 6 partially, but not completely. For example, the aerating apparatus 10 may encircle at least 50%, or at least 60%, or at least 70%, or at least 80%, or at least 90%, or at least 95% of the circumference of the drive shaft 6.

This embodiment differs from those described in FIGS. 1A to 3B also in that the aerating apparatus 10 is attached to the wall 5 of the tank 4, and not to the baffles 14. The aerating apparatus 10 may be attached via suitable attachment means or arrangement 29. Additionally or alternatively, the aerating apparatus 10 could be attached to one or more baffles 14, to the bottom 23 of the tank 4, and/or to any other suitable part or location of the reactor 1, for example to a cover of the reactor 1 or to other structures above the reactor 1.

Other aspects of the embodiment shown in FIGS. 4A and 4B are generally similar to those of the embodiment shown in FIGS. 1A to 3B.

Figure 5A:
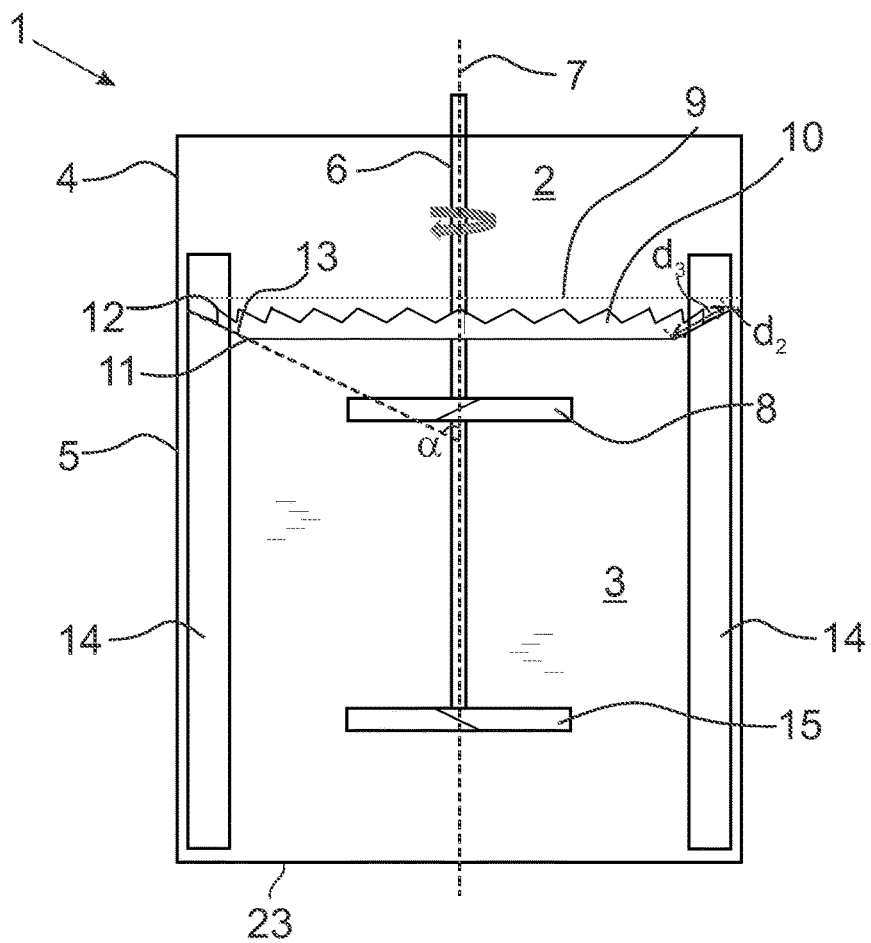
FIGS. 5A and 5B illustrate alternative views and details of a reactor and a method for gas-liquid mass transfer.
Figure 5B:
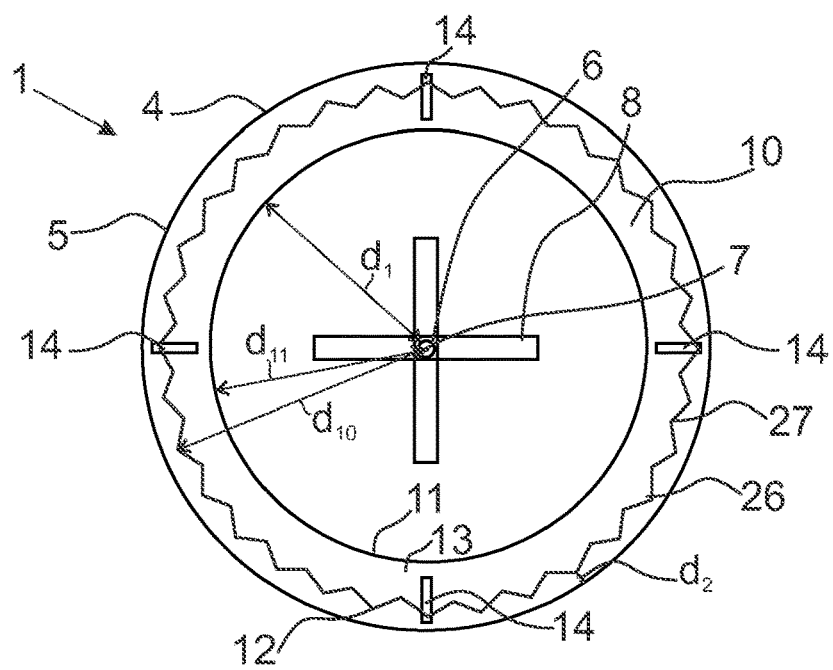

FIGS. 5A and 5B describe an embodiment which differs from those described in FIGS. 1A to 4B at least in that the upper edge 12 of the aerating apparatus 10 has projections 26 and/or indentations 27. In this embodiment, the upper edge 12 has alternating projections 26 and indentations 27. Such an upper edge 12 may assist in dispersing the flow, which is directed over the upper edge 12 and subsequently downwards, in the radial direction. In this exemplary embodiment, the upper edge 12 of the aerating apparatus 10 is serrated, i.e. saw-edged. However, various other shapes, projections and/or indentations may additionally or alternatively be contemplated. For example, the upper edge 12 may have rectangular, triangular and/or semi-circular projections and/or indentations, or it may be cogged or wavy.

Again, in this exemplary embodiment, the inner surface 13 of the aerating apparatus 10 continuously encircles the vertical axis 7 (and the drive shaft 6), thereby forming a closed perimeter.

In this exemplary embodiment, the second distance $d_2$ of the aerating apparatus 10 from the wall 5 of the tank 4 may vary along the upper edge 12. In an embodiment, the second distance $d_2$ may be understood as referring to the shortest distance in between the aerating apparatus 10 and the wall 5 in the radial direction.

In this embodiment, the angle α of the inner surface 13 with respect to the vertical axis 7 is greater than e.g. in the embodiment described in FIG. 1A.

Other aspects of the embodiment shown in FIGS. 5A and 5B are generally similar to those of the embodiment shown in FIGS. 1A to 4B.

Figure 6A:
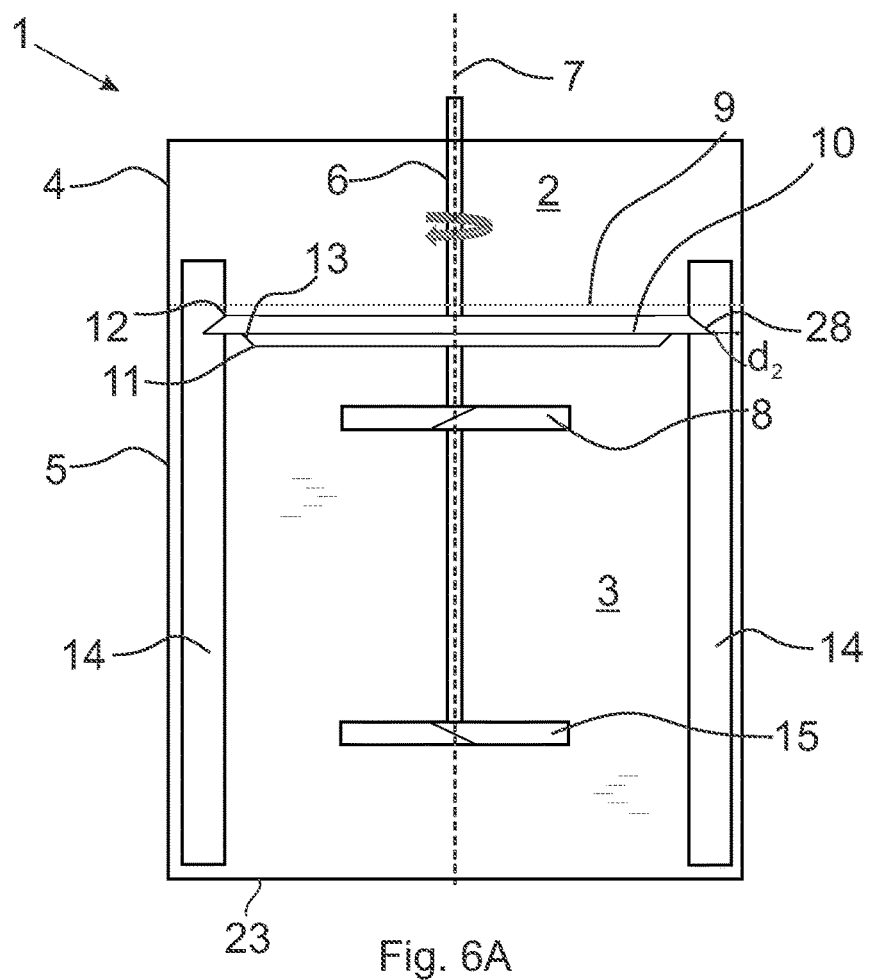
FIGS. 6A and 6B illustrate alternative views and details of a reactor and a method for gas-liquid mass transfer.
Figure 6B:
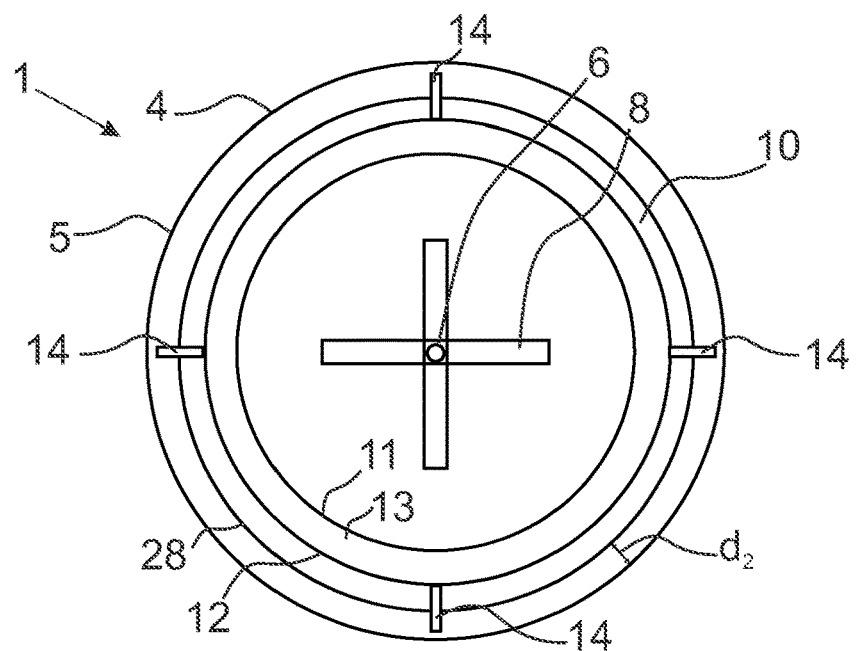

FIGS. 6A and 6B describe an embodiment of the reactor 1 which differs from those described in FIGS. 1A to 5B at least in that the aerating apparatus 10 has an outward bent outer edge 28. The bent outer edge 28 may assist in dispersing the flow, which is directed over the upper edge 12 and subsequently downwards, in the radial direction.

Other aspects of the embodiment shown in FIGS. 6A and 6B are generally similar to those of the embodiment shown in FIGS. 1A to 5B.

Figure 7A:
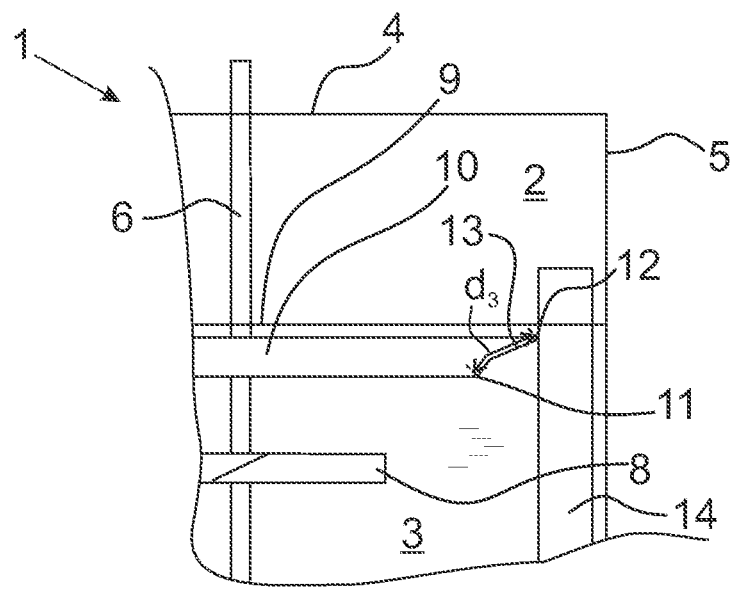
FIGS. 7A and 7B illustrate alternative views and details of a reactor and a method for gas-liquid mass transfer.
Figure 7B:
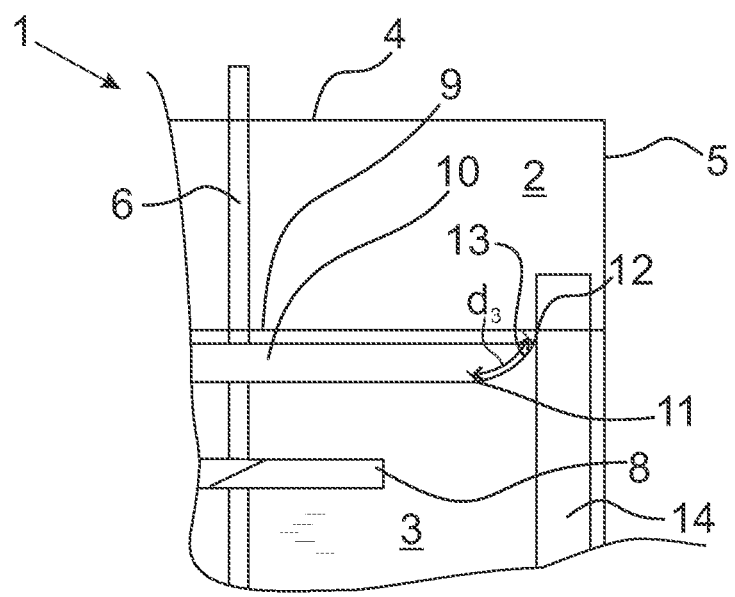

FIGS. 7A and 7B describe partial views of exemplary embodiments of reactors 1. These embodiments differ from those described in FIGS. 1A to 6B at least in that the inner surface 13 of the aerating apparatus 10 is curved. In these embodiments, the distance of the lower edge 11 and the upper edge 12 along the inner surface 13, i.e. $d_3$, may be measured along the curved inner surface 13 as shown in the Figs.

Other aspects of the embodiment shown in FIGS. 7A and 7B are generally similar to those of the embodiment shown in FIGS. 1A to 6B.

Figure 8A:
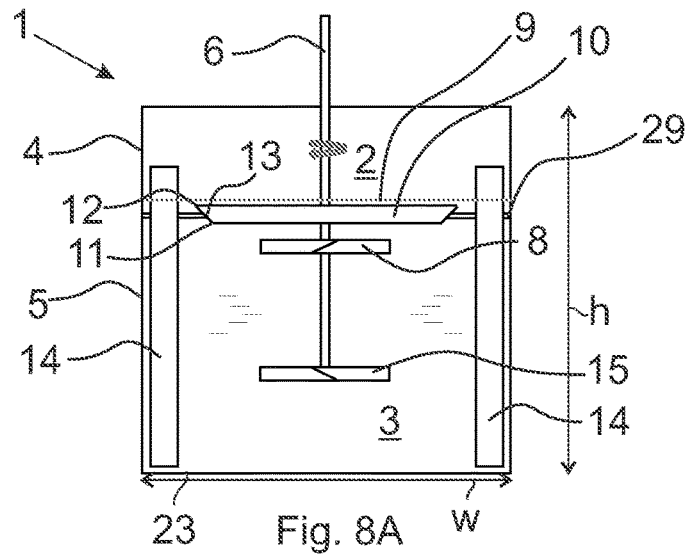
FIGS. 8A, 8B and 8C illustrate alternative views and details of a reactor and method for gas-liquid mass transfer.
Figure 8B:
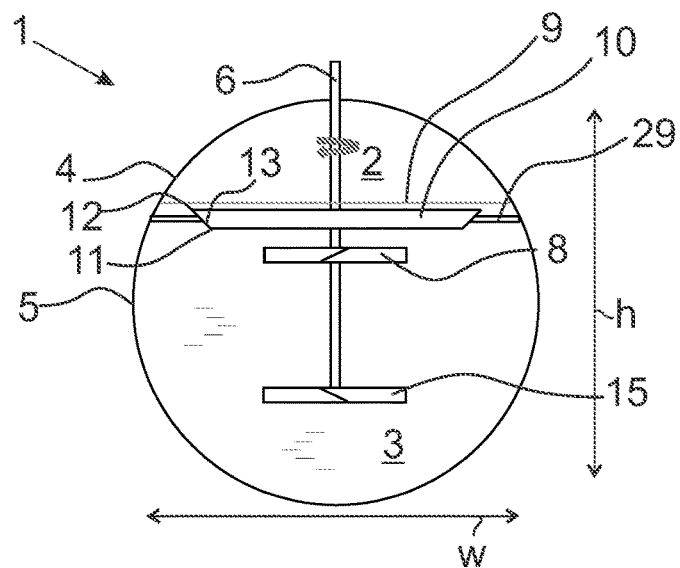
Figure 8C:
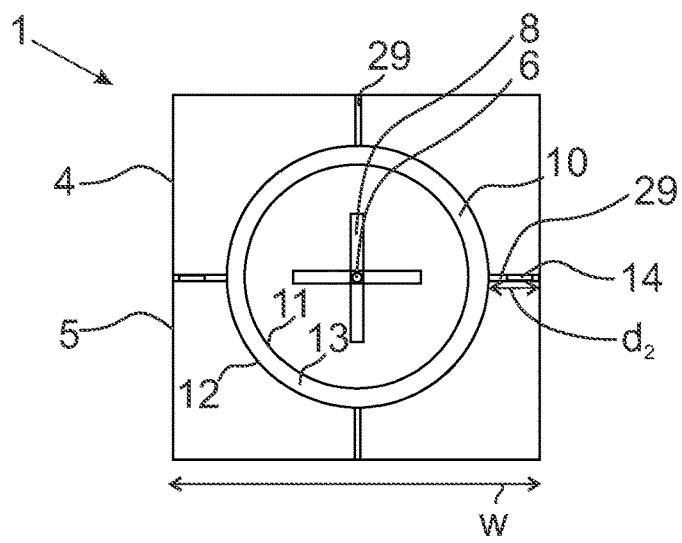

FIGS. 8A, 8B and 8C describe an embodiment in which the reactor 1 is an autoclave-type reactor, and the tank 4 is a horizontal tank. FIG. 8A shows a partially cross-sectional side view of a part of the reactor 1; FIG. 8B shows a second partially cross-sectional side view from a direction perpendicular to the direction of FIG. 8A; and FIG. 8C shows a top view of the part of the reactor 1. The second distance $d_2$ may be considered to be the shortest distance between the aerating apparatus 10 and the wall 5 of the tank 4 in the radial direction.

The aerating apparatus 10 in this exemplary embodiment may be attached, for example, to the baffles 14 and to the walls 5 of the tank 4, or to either. It may be attached via suitable attachment means or arrangement 29.

Other aspects of the embodiment shown in FIGS. 8A, 8B and 8C are generally similar to those of the embodiment shown in FIGS. 1A to 7B.

Figure 9:
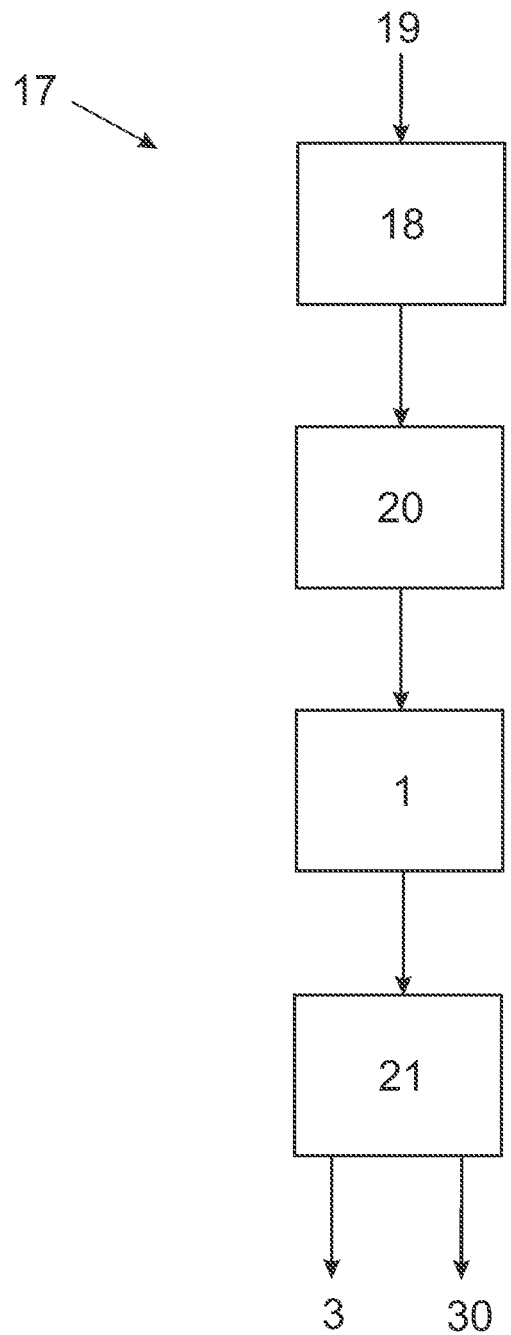
FIG. 9 shows a hydrometallurgical plant.

FIG. 9 illustrates schematically a plant 17 comprising the reactor 1 according to one or more embodiments described in this specification and a method for gas-liquid mass transfer. The plant 17 is a hydrometallurgical plant. The plant may further comprise a crushing and/or grinding unit 18 for grinding raw material 19, for example ore. The plant 17 may further comprise a unit 20 for dissolution of the raw material, e.g. the ore, in an aqueous solution for producing the slurry 3 to be received in the tank 4 (not shown in this Fig.) of the reactor 1. The plant 17 may further comprise a liquid/solid separation unit 21 for separating residual solids 30 from the slurry 3 received in the tank 4. Any one of these units may be in the same or in a different unit process as the reactor 1.

EXAMPLE 1

The effect of the aerating apparatus similar to that shown in FIGS. 1A and 1B was tested in a 373 L reactor having a width of 780 mm with kLa and oxygen utilization measurements made with steady state sodium sulfite oxidation method. A reactor including the aerating apparatus (SAR) was compared to a dual downward pumping (OKTOP3300+ OKTOP3300, both downward pumping agitators) agitator and to the same agitator configuration (OKTOP3300+OK-TOP3310, downward pumping and upward pumping agitator) without the aerating apparatus.

Figure 10:
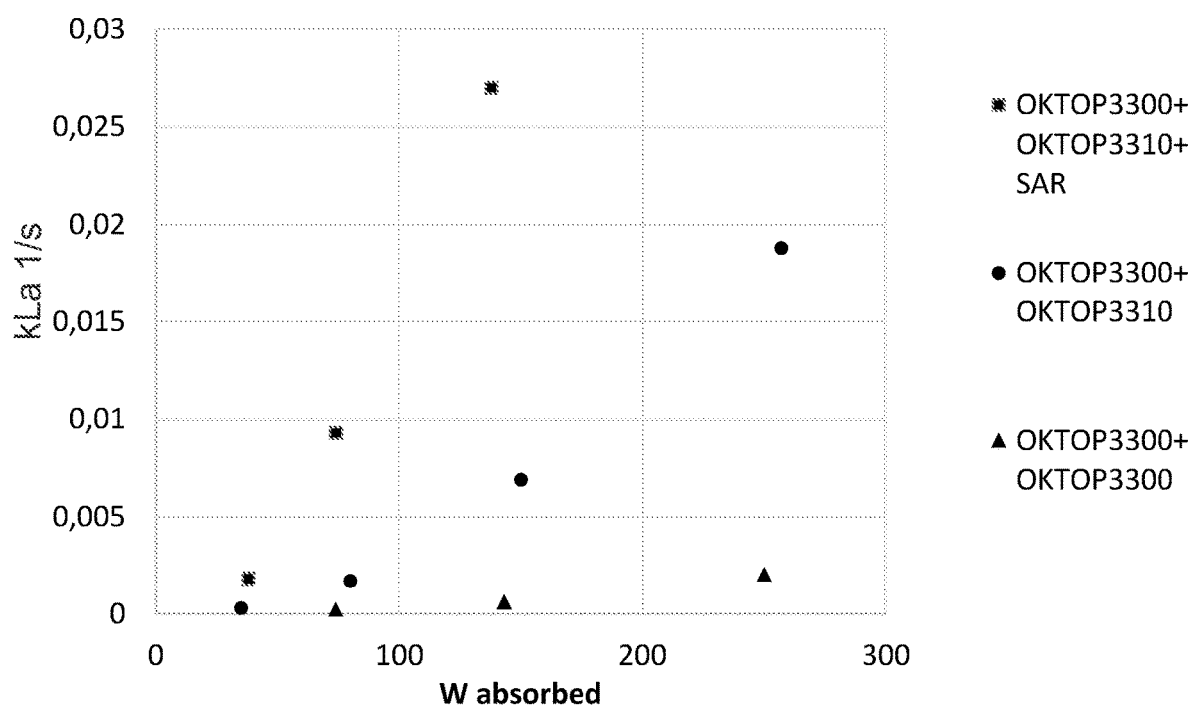
FIG. 10 illustrates experimental measurements of the performance of different reactor configurations.

As shown in FIG. 10, without any additional air feed, much higher volumetric mass transfer coefficients (kLa) were obtained with the same or similar absorbed mixing power (W) when the aerating apparatus (SAR) was included in the reactor as compared to the other reactor configurations.

It is obvious to a person skilled in the art that with the advancement of technology, the basic idea may be implemented in various ways. The embodiments are thus not limited to the examples described above, instead they may vary within the scope of the claims.

The embodiments described hereinbefore may be used in any combination with each other. Several of the embodiments may be combined together to form a further embodiment. A product, a system, a method, or a use, disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A reactor for gas-liquid mass transfer between a gas and a liquid or slurry, the reactor comprising:
   a tank for receiving the liquid or slurry, the tank having a wall;
   a drive shaft extending vertically in the tank and rotatable about a vertical axis;
   an upward pumping impeller for creating a flow of the liquid or slurry received in the tank generally upward and at the surface of the liquid or slurry, the upward pumping impeller being rotatable by the drive shaft and disposed in the upper part of the tank;
   an aerating apparatus disposed above the upward pumping impeller; wherein the aerating apparatus extends between the drive shaft and the wall of the tank at a first distance (d1) from the drive shaft and at a second distance (d2) from the wall of the tank, the aerating apparatus encircling the drive shaft at least partially,
   the aerating apparatus having a lower edge and an upper edge and, extending between the lower edge and the upper edge, an outward inclined or curved inner surface for directing at least a part of the flow over the inner surface outward from the vertical axis and over the upper edge.

2. The reactor according to claim 1, wherein the aerating apparatus is immovable relative to the tank.

3. The reactor according to claim 1, wherein the inner surface is outward inclined at an angle (a) of about 200 to about 80° with respect to the vertical axis.

4. The reactor according to claim 1, wherein the inner surface of the aerating apparatus continuously encircles the vertical axis, thereby forming a closed perimeter.

5. The reactor according to claim 1, wherein the distance of the lower edge and the upper edge along the inner surface (d3) is about 0.04 to 0.20 times the width (w) of the tank.

6. The reactor according to claim 1, wherein the distance of the lower edge and the upper edge in the radial direction (d4) is about 0.03 to 0.18 times the width (w) of the tank.

7. The reactor according to claim 1, wherein the distance of the lower edge and the upper edge in the vertical direction (d5) is about 0.03 to 0.18 times the width (w) of the tank.

8. The reactor according to claim 1, wherein the upper edge of the aerating apparatus has projections, indentations, and/or alternating projections and indentations.

9. The reactor according to claim 1, wherein the reactor further comprises one or more baffles arranged between the wall of the tank and the upward pumping impeller, to which the aerating apparatus is attached.

10. The reactor according to claim 1, wherein the reactor further comprises a second impeller disposed below the upward pumping impeller.

11. The reactor according to claim 1, wherein the ratio of the height (h) of the tank to the width (w) of the tank is in the range of 1:2 to 2.5:1, for example 0.7:1 to 2:1.

12. The reactor according to claim 1, wherein the aerating apparatus is disposed above the upward pumping impeller such that when in use, the aerating apparatus is submerged in the liquid or slurry received in the tank when the upward pumping impeller is activated so as to be rotated by the drive shaft.

13. The reactor according to claim 1, wherein the distance (d7) in the vertical direction between the upward pumping impeller and the lower edge of the aerating apparatus is 0.1 to 0.8 times the diameter (di) of the upward pumping impeller.

14. The reactor according to claim 1, wherein when in use, the distance (d8) in the vertical direction between the upward pumping impeller and the surface of the liquid or slurry is 0.2 to 1.5 times the diameter (d1) of the upward pumping impeller.

15. The reactor according to claim 1, wherein the upward pumping impeller has an outer edge disposed at a distance (d9) of the vertical axis, and wherein the upper edge of the aerating apparatus is disposed at a distance (d10) of the vertical axis that is greater than said distance of the outer edge of the upward pumping impeller.

16. The reactor according to claim 1, wherein the upward pumping impeller has an outer edge disposed at a distance (d9) of the vertical axis, and wherein the lower edge of the aerating apparatus is disposed at a distance (d11) of the vertical axis that is greater than said distance (d9) of the outer edge of the upward pumping impeller.

17. The reactor according to claim 1, wherein the reactor is a stirred tank reactor for gas-liquid mass transfer between a gas and a liquid or slurry in a hydrometallurgical application.

18. A plant comprising the reactor according to claim 1.

19. The plant according to claim 18, wherein the plant is a hydrometallurgical plant further comprising at least one of the following:
a crushing and/or grinding unit for grinding raw material, such as ore;
a unit for dissolution of the raw material in an aqueous solution for producing the slurry to be received in the tank; and/or
a liquid/solid separation unit for separating residual solids from the slurry received in the tank.

20. A method for gas-liquid mass transfer between a gas and a liquid or slurry, the method comprising providing the liquid or the slurry into a reactor according to claim 1, and into the tank thereof,
rotating the upward pumping impeller, thereby creating a flow of the liquid or slurry received in
the tank generally upward and at the surface of the liquid or slurry, so that the aerating apparatus is submerged in the liquid or slurry received in the tank; wherein
the aerating apparatus disposed above the upward pumping impeller directs the at least the part of the flow over the inner surface outward from the vertical axis and over the upper edge.

21. The method according to claim 20, wherein the method is a hydrometallurgical method.

* * * * *

UNITED STATES PATENT AND TRADEMARK OFFICE
CERTIFICATE OF CORRECTION

PATENT NO. : 10,865,459 B2  
APPLICATION NO. : 16/921992  
DATED : December 15, 2020  
INVENTOR(S) : Latva-Kokko et al.

Page 1 of 1

It is certified that error appears in the above-identified patent and that said Letters Patent is hereby corrected as shown below:

In the Claims

At Column 12, Lines 62-64:
"3. The reactor according to claim 1, wherein the inner surface is outward inclined at an angle (a) of about 200 to about 80° with respect to the vertical axis."

Should read:
--3. The reactor according to claim 1, wherein the inner surface is outward inclined at an angle ($\alpha$) of about 20° to about 80° with respect to the vertical axis.--

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*